United States Patent
Chan

(10) Patent No.: US 6,299,195 B1
(45) Date of Patent: Oct. 9, 2001

(54) GOLF CART

(76) Inventor: Corwyn Chan, 109 des Rossignols, Cowansville, Quebec (CA), J2K 3W5

( * ) Notice: Subject to any disclaimer, the term of this patent is extended or adjusted under 35 U.S.C. 154(b) by 0 days.

(21) Appl. No.: 09/329,116

(22) Filed: Jun. 9, 1999

Related U.S. Application Data

(60) Provisional application No. 60/089,017, filed on Jun. 12, 1998.

(51) Int. Cl.⁷ ............................................. B62B 3/02
(52) U.S. Cl. .................. 280/651; 280/62; 280/DIG. 6; 280/47.34
(58) Field of Search ................... 280/641, 642, 280/651, 42, 62, DIG. 6, 655.1, 652, 47.34

(56) References Cited

U.S. PATENT DOCUMENTS

| | | | |
|---|---|---|---|
| D. 166,308 | * 4/1952 | Grant | 280/DIG. 6 |
| 4,121,855 | * 10/1978 | Mortenson | 280/47.29 X |
| 4,426,099 | * 1/1984 | Gross | 280/47.29 X |
| 4,793,622 | * 12/1988 | Sydlow | 280/DIG. 6 |
| 5,024,458 | * 6/1991 | Kazmark et al. | 280/47.29 X |
| 5,193,842 | * 3/1993 | Fontenot | 280/DIG. 6 |
| 5,439,239 | * 8/1995 | Su | 280/47.29 X |
| 5,476,275 | * 12/1995 | Baechler et al. | 280/62 X |
| 5,695,212 | * 12/1997 | Hinkston | 280/62 X |
| 5,820,140 | * 10/1998 | Huang | 280/641 X |
| 6,000,712 | * 12/1999 | Wu | 280/DIG. 6 |
| 6,099,020 | * 8/2000 | Liao | 280/DIG. 6 |

* cited by examiner

Primary Examiner—Michael Mar
(74) Attorney, Agent, or Firm—Eric Fincham

(57) ABSTRACT

A three wheeled golf cart for receiving and supporting a golf bag which comprises a lower frame and an upper frame which are perpendicularly mounted with respect to each other, quick disconnect wheels, and a generally U-shaped bag receiving cradle extending rearwardly of the upper frame to receive and support an upper portion of the golf bag, the upper frame extending upwardly at an angle of less than 90 degrees with respect to the lower frame. The golf cart provides a very secure platform and with large wheels, requires little effort to propel.

14 Claims, 5 Drawing Sheets

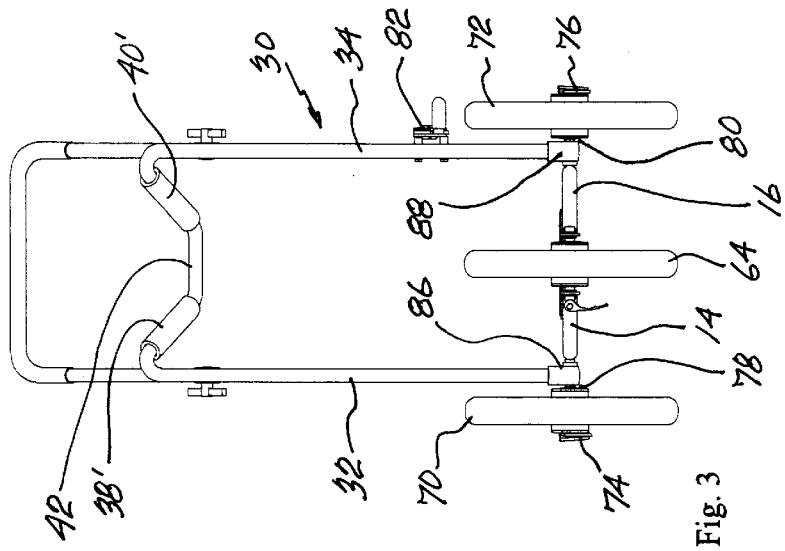
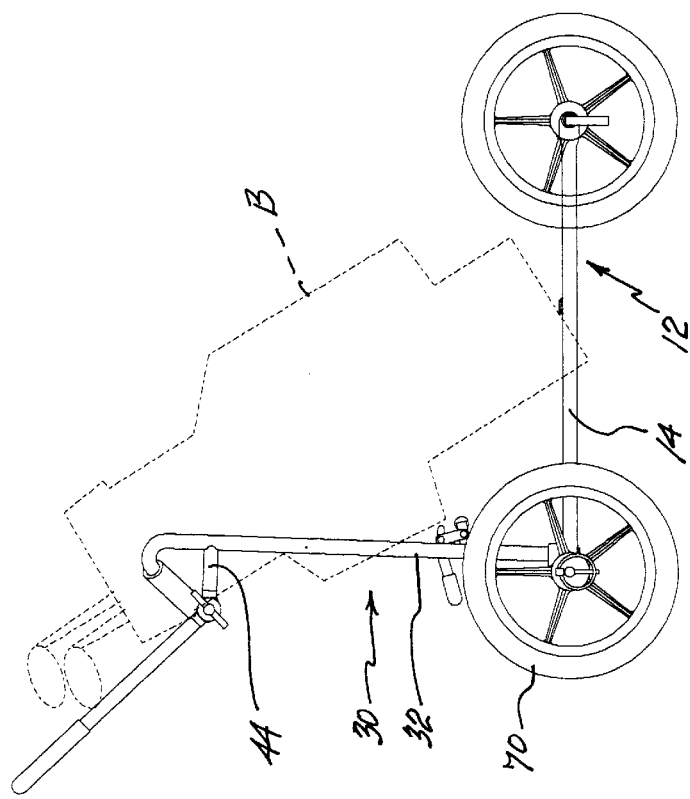
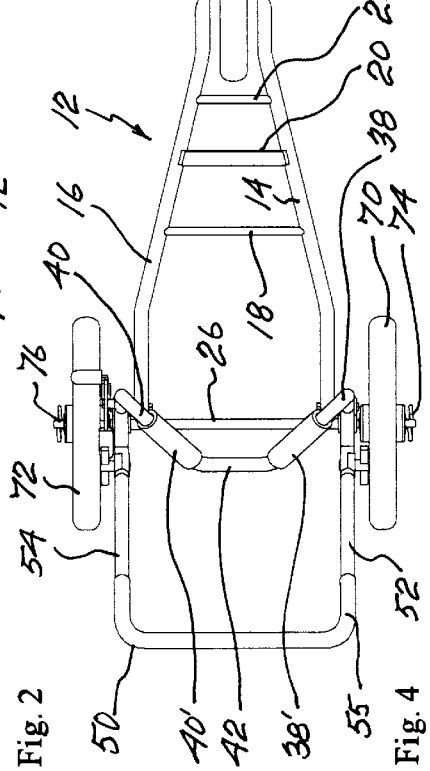
Fig. 2
Fig. 3
Fig. 4

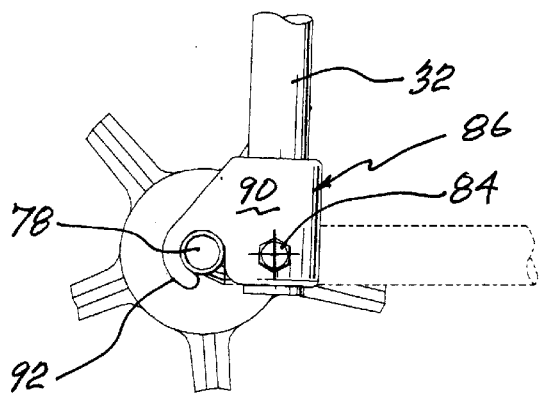
Fig. 7
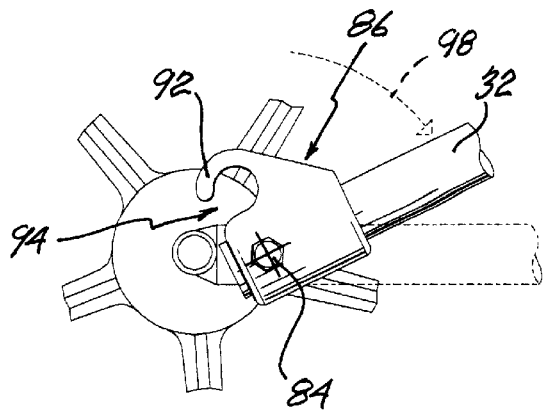
Fig. 8
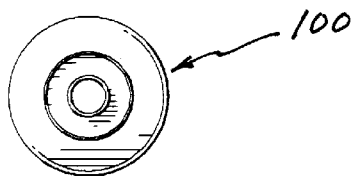
Fig. 9
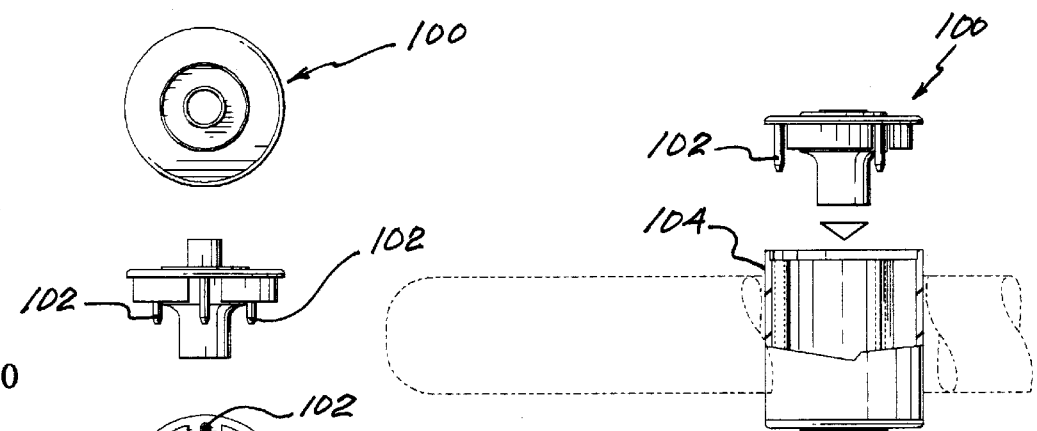
Fig. 10
Fig. 13
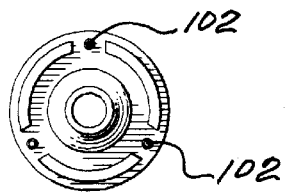
Fig. 11
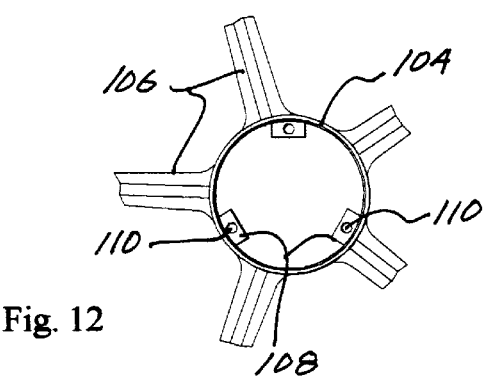
Fig. 12
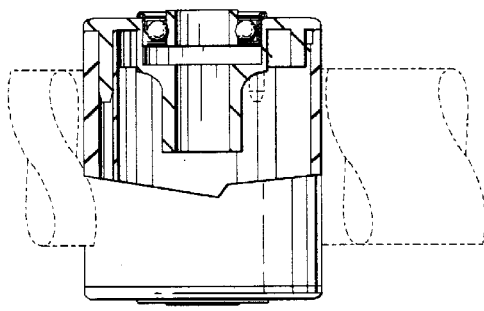
Fig. 14

GOLF CART

This appln claims benefit of Provisional No. 68/089,017 filed Jun. 12, 1998.

BACKGROUND OF THE INVENTION

The present invention relates to a golf cart.

The use of golf carts is well known in the art and many different types have been proposed and are currently available on the market. Generally, golf carts fall into two distinct categories—those for the rental market and those which are intended to be sold to the individual golfer.

The rental market golf carts are typically purchased by the golf course and rented out to the golfer. Such units typically will have a body portion designed to receive the golf bag and a handle portion which is detachable. For ease of use, the golf course will store the carts in available outside space and retain the handles within, the handles being given to the renter upon payment of the required fee. Thus, the prime consideration for such carts is the removability of the handle.

For the retail market wherein the cart is purchased by the user, the key consideration is the compactness of the cart such that it may be transported by the golfer to the golf course. Typically, such carts have consisted of bi-wheel arrangements which can be readily folded and placed in the trunk of a car.

A well known type of cart, both for retail and rental markets, consists of a two-wheel golf cart which is generally designed to be pulled behind the golfer. While it can be pushed ahead of the golfer, such an arrangement is somewhat awkward and as a result, the golfer will normally walk with one arm extended rearwardly pulling the two wheeled cart. Some golfers have noted that this arrangement leaves them somewhat fatigued at the end of a round of golf and in particular, sore shoulders have been encountered. Pushing a golf cart, on the other hand, generally requires that more body muscles be used and therefore the work is spread over a larger muscle mass and the golfer will suffer less fatigue.

SUMMARY OF THE INVENTION

It is an object of the present invention to provide a golf cart which may be pushed by the golfer and which provides a stable platform for a golf bag.

It is a further object of the present invention to provide a three-wheeled golf cart which may be folded to a compact position for transport by the golfer.

It is a further object of the present invention to provide a three-wheeled golf cart which may be used as a rental cart and which may be quickly and efficiently stored.

According to one aspect of the present invention, there is provided a golf cart for receiving and supporting a golf bag, the golf cart comprising a lower frame having a front end and a rear end; a front wheel mounted at the front end of the lower frame; first and second rear wheels mounted at opposite sides of the lower frame proximate the rear end of the lower frame; an upper frame extending upwardly from the lower frame adjacent the rear end of the lower frame, means for hingedly securing the upper frame to the lower frame, the upper frame forming an angle with respect to a generally horizontal plane of the lower frame of less than 90 degrees; a bag receiving cradle extending rearwardly of the upper frame from an upper end thereof to receive and support an upper portion of the golf bag; and handle means, the handle means including means for securing the handle to the upper frame.

According to a further aspect of the present invention, there is provided a golf cart for receiving and supporting a golf bag, the golf cart comprising a lower frame having a front end and a rear end; a front wheel mounted at the front end of the lower frame; first and second rear wheels mounted at opposite sides of the lower frame proximate the rear end of the lower frame; an upper frame extending upwardly from the lower frame adjacent the rear end of the lower frame, the upper frame being hingedly secured to the lower frame; a generally U-shaped bag receiving cradle extending rearwardly of the upper frame to receive and support an upper portion of the golf bag; retaining means for retaining the upper frame in a generally vertical orientation, the upper frame folding downwardly to lie adjacent the lower frame such that the generally U-shaped bag receiving cradle extends about the front wheel when in a folded position.

According to a further aspect of the present invention, there is provided a golf cart storage arrangement comprising a storage rack and a plurality of golf carts, the storage rack having a longitudinally extending storage rack base; a plurality of aligned stop means spaced along the longitudinally extending storage rack base; an upwardly extending storage rack support member; a plurality of the golf carts mounted on the storage rack, each golf cart having a lower frame with a front end and a rear end, a front wheel mounted at the front end of the lower frame, first and second rear wheels mounted at opposite sides of the lower frame proximate the rear end of the lower frame, an upper frame extending upwardly from the lower frame adjacent the rear end of the lower frame, means for hingedly securing the upper frame to the lower frame such that the upper frame in a storage position lies in a generally co-planar relationship with the lower frame, and a bag receiving cradle extending rearwardly of the upper frame from an upper end thereof to receive and support an upper portion of the golf bag; the golf carts being stored on the storage rack while in a storage position such that the first and second rear wheels are mounted on opposite sides of the longitudinally extending member, and the front wheel is supported by the upwardly extending storage rack support member, the lower frame and the folded upper frame lying at an angle with respect to a vertical plane and being prevented from movement by action of a stop member on the frame.

In greater detail, the golf cart is one which is both suitable for both the rental market and for the retail market—one wherein the golfer buys the cart and transports it to and from the golf course.

Particularly in the embodiment wherein the cart is designed for transport back and forth to the golf course, both the front wheel and rear wheel are preferably attached by means of a quick release or quick dismount connection. Several such connections are known to those skilled in the art and are used on other wheeled vehicles such as bicycles and the like.

As will be appreciated, a three wheeled golf cart can roll at any moment when on an incline and therefore the golf cart preferably includes a brake member. Many known brake members exist and generally, the brake member is preferably mounted on the upper frame proximate one of the rear wheels. The brake member will include a wheel contacting member moveable into and out of a contacting position with the wheel. To do so, there may be provided a handle which may be operated by either the hand or foot of the user.

The golf cart, as aforementioned, includes a bag receiving cradle which extends rearwardly from the upper frame. In a preferred embodiment, the rearwardly extending cradle is formed integrally with the upper frame as a tubular member which is bent into the desired configuration. As such, the rearwardly extending cradle may have a somewhat U-shaped configuration with a rear portion and a pair of side arms designed to engage the upper portion of a golf bag. In such an embodiment, preferably the side arms (and optionally the rear portion) will include padding to cushion the golf bag.

The lower frame may be formed in many different configurations. In one particular embodiment, there is provided a first lower frame member which extends from proximate the first rear wheel to proximate a first side of the front wheel with a second lower frame member extending from proximate the second rear wheel to proximate the second side of the front wheel, and with a plurality of transverse lower frame members extending between the first and second lower frame members. In this embodiment, one or more of the transversely extending frame members may be adapted to receive and support a bottom end of the golf bag. For this purpose, the transverse lower frame member may be configured to support and retain the golf bag and/or may have padding thereon.

The lower frame, as aforementioned, may have a specific bag receiving portion which can be of many different configurations. In order to further provide a compact golf cart, the lower frame could be formed to have a telescoping configuration.

The handle portion of the golf cart can have many different configurations ranging from a U-shaped handle to a T-shaped handle, etc. In the embodiment wherein the golf cart is designed for transport back and forth to a golf course, the handle is preferably pivotably connected so that it may be folded to a position adjacent the upper frame. In the case of a golf cart for the rental market, the handle is preferably removeable and to this end, many suitable mechanisms may be provided for locking the handle to the cart.

The wheels of the golf cart are preferably of a substantially identical size and designed to provide as smooth a ride as possible. To this end, the wheels are preferably of a relatively large diameter—i.e. 30–40 centimeters. The wheels may be molded of a soft cushion material to provide a desirable feel to the ride.

The mounting of the wheels may be any conventional although a particularly preferred one is shown in the accompanying drawings wherein the wheel is mounted using a removeable or insertable bearing assembly.

In a preferred embodiment of the invention, a bearing unit which is self contained is utilized in the mounting of the wheels. This provides for easy manufacture of the cart.

BRIEF DESCRIPTION OF THE DRAWINGS

Having thus generally described the invention, reference will be made to the accompanying drawings illustrating embodiments thereof, in which:

FIG. 2 is a side elevational view thereof;

FIG. 3 is a front elevational view thereof;

FIG. 4 is a top plan view thereof;

FIG. 7 is a detail view illustrating the retaining member for maintaining the upper frame in an operative position;

FIG. 8 is a view similar to FIG. 7 illustrating the folding motion shown in FIG. 6;

FIG. 9 is a top plan view of a bearing unit for the wheel;

FIG. 10 is a side elevational view of the bearing unit;

FIG. 11 is a bottom plan view of the bearing unit;

FIG. 12 is a side elevational view of the wheel hub;

FIG. 13 is a top plan view, partially in cross section, of a wheel hub receiving the bearing unit;

FIG. 14 is a partial cutaway view of the hub and bearing;

DESCRIPTION OF THE PREFERRED EMBODIMENTS

Figure 1:
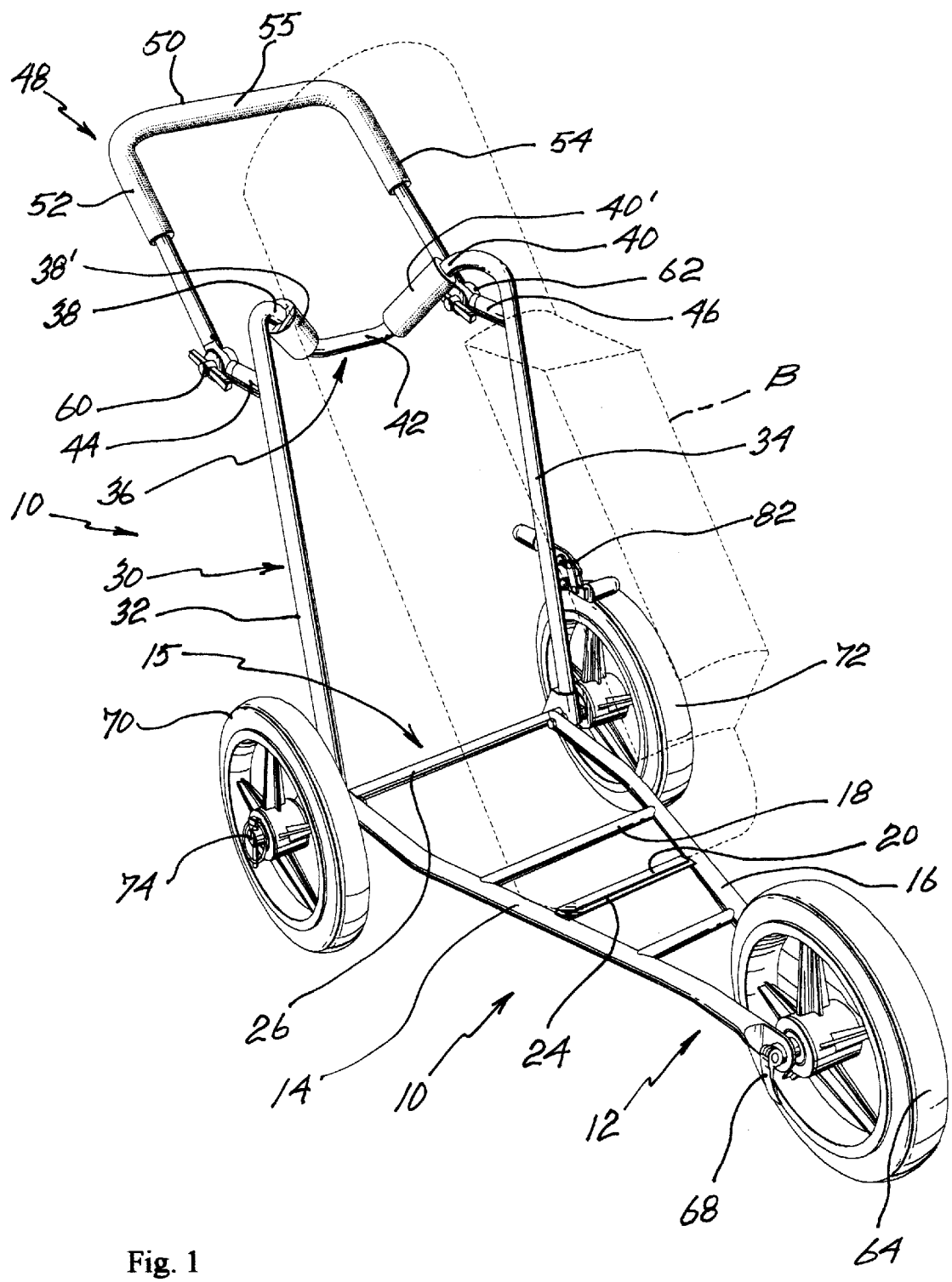
FIG. 1 is a perspective view of a golf cart according to the present invention.
Figure 5:
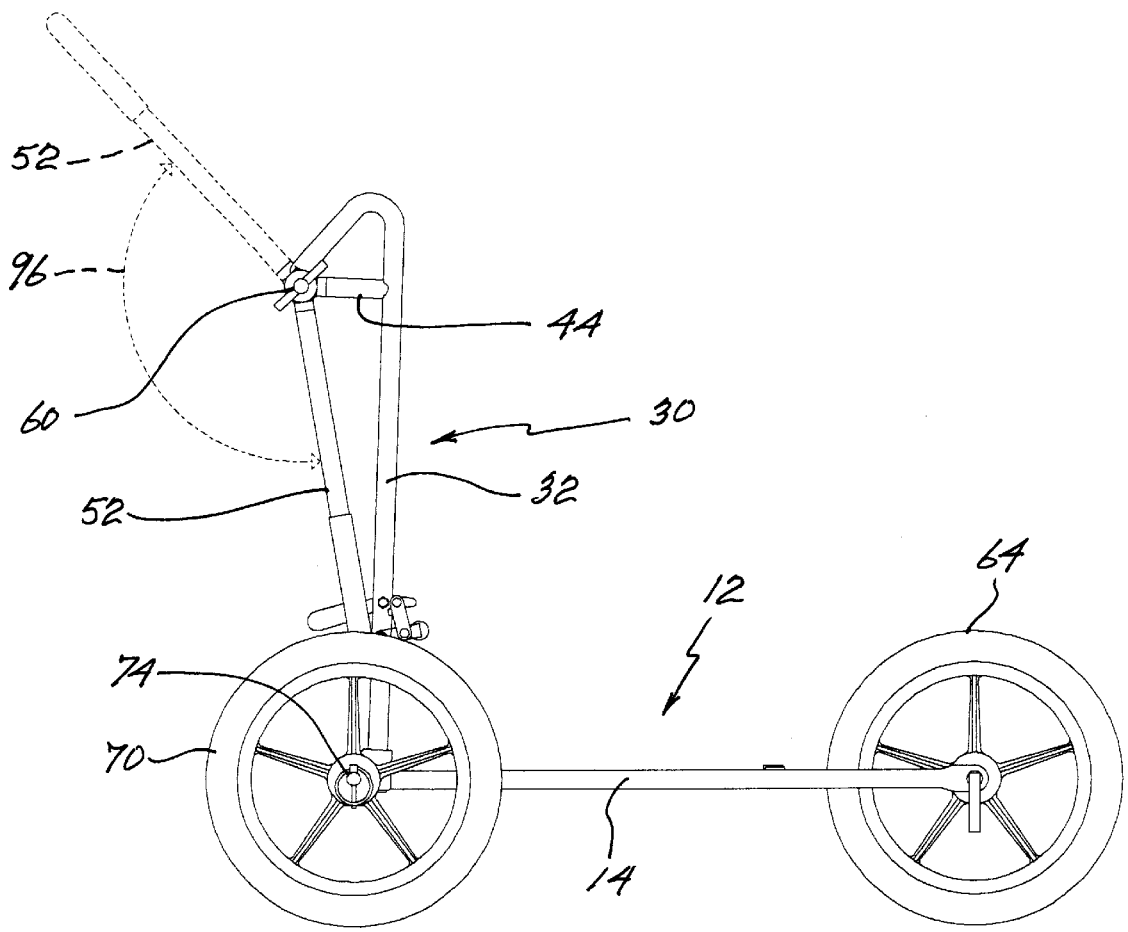
FIG. 5 is a side elevational view similar to FIG. 2 illustrating the folding of the handle.
Figure 6:
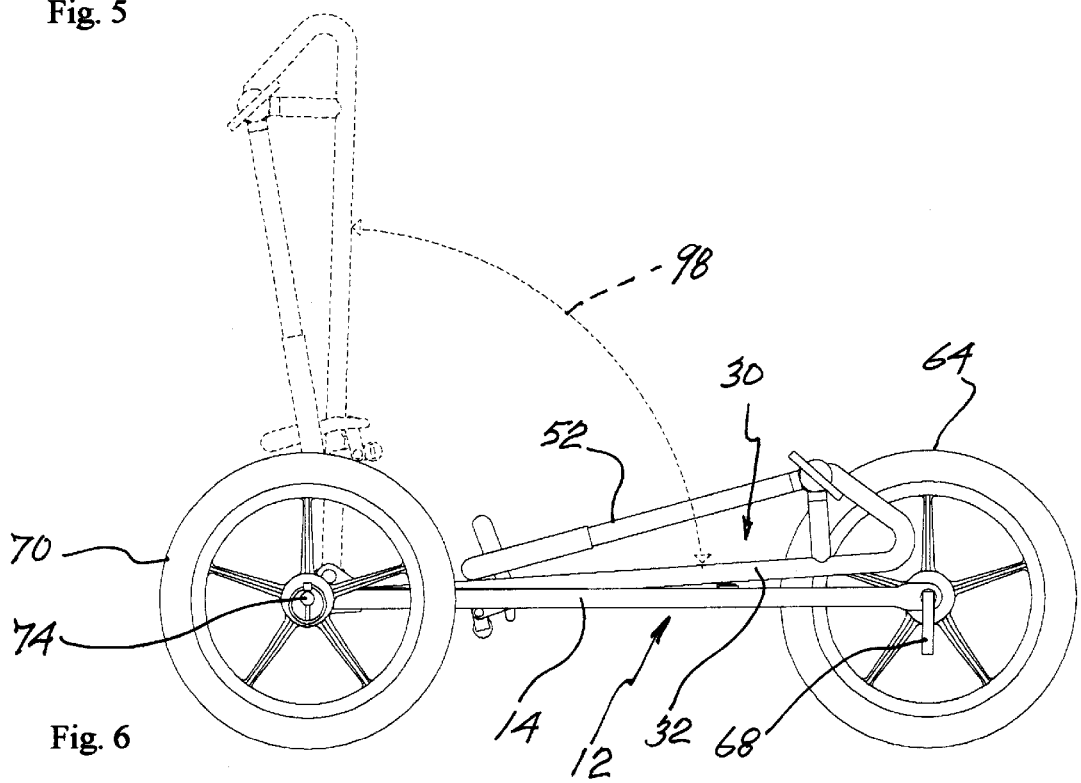
FIG. 6 is a side elevational view illustrating the folding of the upper frame to a storage position.

Referring to the drawings in greater detail and by reference characters thereto, there is illustrated in FIG. 1 a golf cart which is generally designated by reference numeral 10. Golf cart 10 includes a somewhat triangularly shaped lower frame portion generally designated by reference numeral 12.

Lower frame portion 12 includes a pair of lower frame side members 14 and 16 which, as may be seen in FIGS. 1 and 4, extend somewhat inwardly from a rear end generally designated by reference numeral 15 to a front end generally designated by reference numeral 17. A plurality of transverse bars 18, 20 and 22 extend between side members 14 and 16. Transverse bar 20 includes a padding 24 thereon. At rear end 15, there is a further rear transverse bar 26.

Golf cart 10 includes an upper frame generally designated by reference numeral 30 and which includes a first leg 32 and a second leg 34 which are substantially parallel to each other. At their upper end, first leg 32 and second leg 34 merge with a U-shaped cradle portion generally designated by reference numeral 36 and which is comprised of a first arm 38 having a padding 38' thereon, a second aim 40 having padding 40' thereon, and a base 42.

Extending rearwardly from first leg 32 and second leg 34 are stub arms 44 and 46 respectively. Stub aims 44, 46 are designed to receive a U-shaped handle generally designated by reference numeral 48 and which handle includes a base 50 and a pair of parallel arms 52 and 54. A suitable padding 55 may be provided on U-shaped handle 48. Locking devices 60 and 62 are provided for adjustably retaining U-shaped handle 48 in the desired position.

Mounted at front end 17 of lower frame 12 is a front wheel 64, which is mounted on an axle 66 extending between the front distal ends of lower frame side members 14 and 16. A quick release device 68 is provided for locking front wheel 64 in position on axle 66 while also permitting the release thereof for storage purposes.

Rear wheels 70 and 72 are mounted on stub axles 78 and 80 respectively and which axles are an extension of rear transverse bar 26. Quick release mechanisms 74, 76 are associated with each of rear wheels 70, 72 respectively.

As may be seen in FIGS. 1 and 3, a brake mechanism 82 may be provided for engaging rear wheel 72 when it is desired to maintain the golf cart stationary.

First and second retaining members 86 and 88 are provided for maintaining upper frame 30 in an upright position. As both retaining members 86, 88 are substantially identical, only one will be described herein. As may be best seen in FIGS. 7 and 8, leg 32 is pivotable about a pin 84 extending through retaining member 86, leg 32 and lower frame side member 14. Retaining member 86 is designed to receive an end of leg 32 within a body portion 90. Retaining member 88 includes a tongue 92 which defines a recess 94. Recess 94 is sized to receive stub axle 78 and the opening to recess 94 is sized such that a slight force is exerted upon entry or exit of stub axle 78 into recess 94. Retaining member 88 is made of a somewhat flexible resilient material having an elastic memory.

In use, a golf bag B is placed such that a bottom thereof engages padding 24 on transverse bar 20 while an upper portion rests in cradle 36 and more particularly, is cushioned by means of padding 38' and 40'. For maintaining a proper balance, legs 32 and 34 extend upwardly from lower frame 12 at an angle which is equal to or slightly less than the perpendicular. Preferably, the angle formed between lower frame 12 and legs 32, 34 is between 84–89 degrees.

For storage purposes, when the golf bag has been removed, handle 48 may be folded downwardly as indicated by arrow 96 to lie substantially adjacent to upper frame 30. In turn, a forward pressure on upper frame 30 will cause the release of retaining members 86 and 88 as shown in FIG. 8 whereby upper frame 30 may be then folded as indicated by arrow 98 to lie substantially adjacent lower frame 12.

In this arrangement, the cart folds down to a vary compact size. For even more compactness, quick release devices 68, 74 and 76 may be operated to remove wheels 64, 70 and 72 respectively. With such an arrangement, it is possible to fit a number of such golf carts in the storage portion of a vehicle such as an automobile.

In an alternative arrangement, and wherein the golf cart might be used as a rental cart by the golf course, it would not be necessary to use quick release mechanisms on the wheel. Rather, they may be mounted in a more permanent fashion as is conventional. Similarly, instead of providing for locking devices 60 and 62 for U-shaped handle 48, the handle may be insertable into stub arms 44 and 46 and a retaining mechanism be provided. By so doing, the cart would be maintained outside with only the handle portion being maintained inside and rented.

As shown in FIGS. 9 to 14, there is preferably provided a bearing unit generally designated by reference numeral 100 and which bearing unit 100 includes three locating prongs 102. As seen in FIG. 12, wheel 70 has a hub 104 having spokes 105 emanating therefrom. Extending inwardly of hub 104 are three tabs 108 each having an aperture 110 associated therewith.

When mounted, bearing unit 100 fits within hub 104 with locating prongs 102 engaging apertures 110 of tabs 108.

Figure 15:
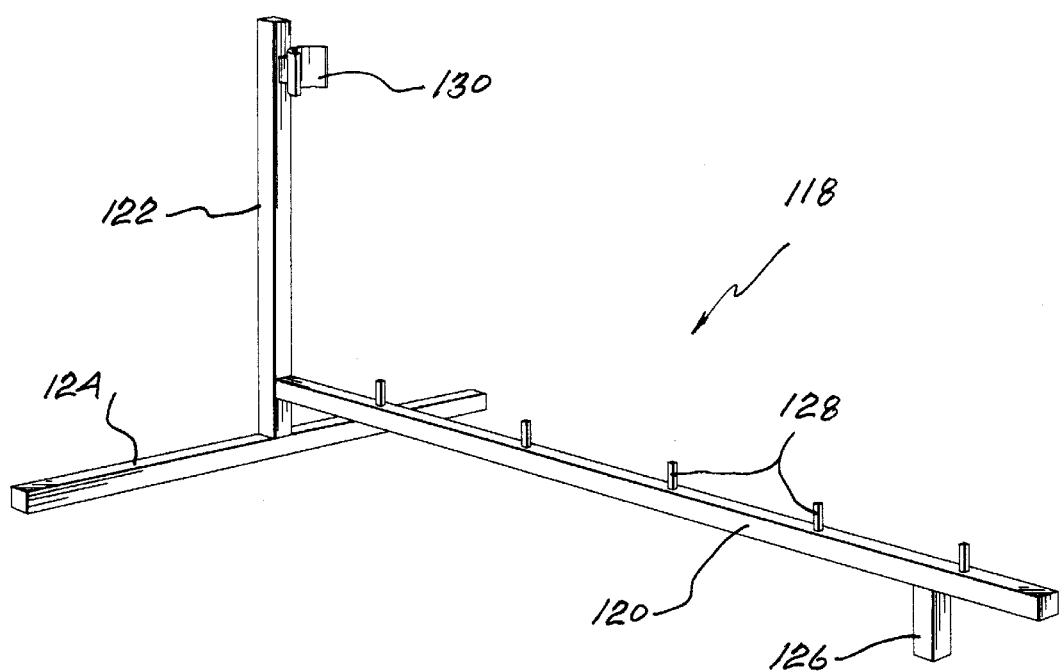
FIG. 15 is a perspective view of a storage device for use with the golf cart of the present invention.
Figure 16:
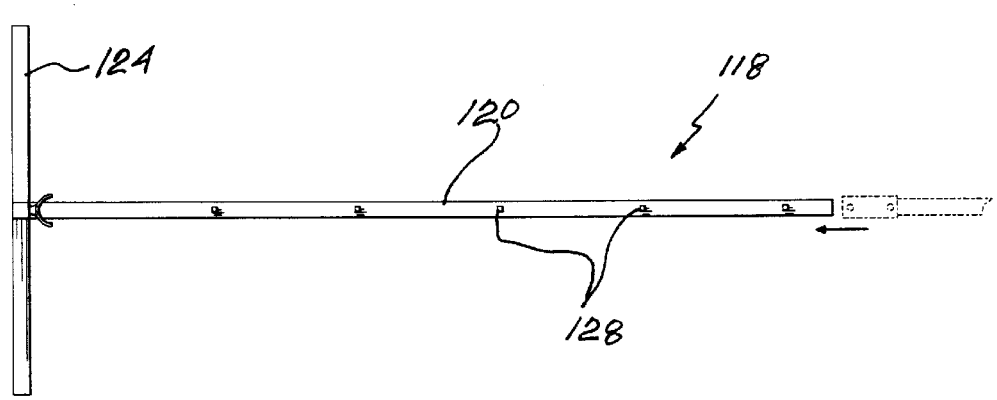
FIG. 16 is a top plan view thereof.
Figure 17:
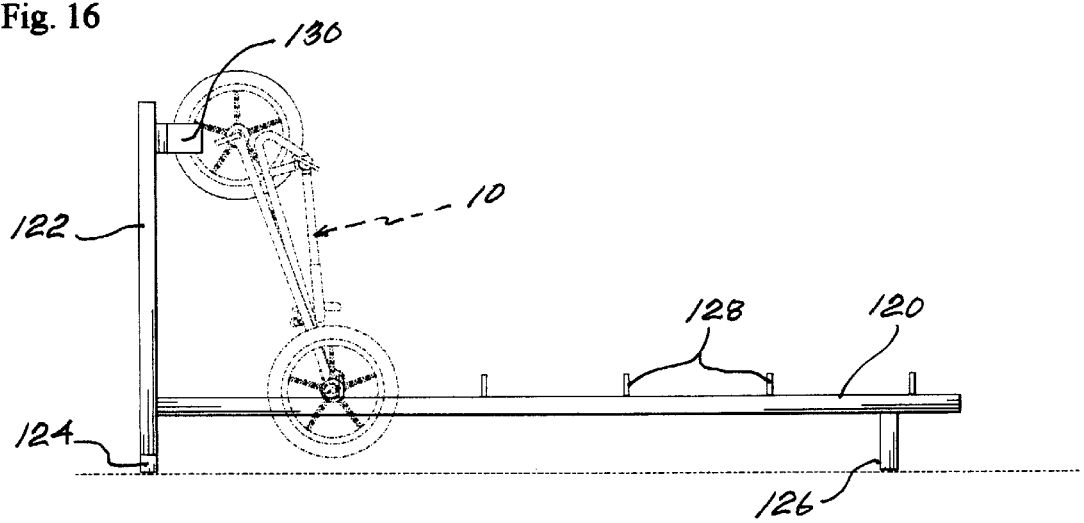
FIG. 17 is a side elevational view thereof showing placement of a cart thereon.

As previously discussed, a storage device for use with rental carts is highly desirable and such a storage device is illustrated in FIGS. 15 to 17 and will now be referred to.

A storage device or storage rack is generally designated by reference numeral 118 and includes a longitudinally extending base member 120 which may be a metallic bar. Extending upwardly from one end of longitudinally extending base member 120 is an upwardly extending support member 122. In turn, a horizontal base 124 stabilizes and supports storage rack 118 in conjunction with a downwardly extending leg 126 from longitudinally extending base member 120.

Located on an upper surface of longitudinally extending base member 120 are a plurality of stop members 128. Located on an upper portion of upwardly extending support member 122 is a wheel support 130. In use, as may be best seen in FIG. 17, a cart 10 may be placed in a stored position with front wheel 64 being supported by wheel support 130 and stop member 128 engaging the lower frame. The carts can then be placed in an end to end relationship.

If desired, the storage rack 118 may be extended by means of extension members generally designated by reference numeral 132.

It will be understood that the above described embodiments are for purposes of illustration only and that changes and modifications may be made thereto without departing from the spirit and scope of the invention.

I claim:

1. A golf cart for receiving and supporting a golf bag, said golf cart comprising:

a lower frame having a front end and a rear end;

a front wheel mounted at said front end of said lower frame;

first and second rear wheels mounted at opposite sides of said lower frame proximate said rear end of said lower frame;

an upper frame formed by a pair of leg members extending upwardly from said lower frame adjacent said rear end of said lower frame, means for hingedly securing said upper frame to said lower frame, said upper frame forming an angle with respect to a generally horizontal plane of said lower frame of less than 90 degrees;

a generally U-shape bag receiving cradle having opposite ends joined to upper ends of said pair of leg members with said bag receiving cradle extending rearwardly and downwardly of said upper frame from an upper end thereof to receive and support an upper portion of said golf bag; and handle means, said handle means including means for pivotally securing said handle means to said pair of leg members of said upper frame.

2. The golf cart of claim 1 wherein said front wheel is mounted at said front end of said lower frame by a quick disconnect member.

3. The golf cart of claim 2 wherein said first and second rear wheels mounted at opposite sides of said lower frame are mounted thereon with a quick disconnect member.

4. The golf cart of claim 1 further including a brake member, said brake member being mounted on said upper frame proximate said first rear wheel, said brake including a wheel contacting member moveable into and out of contact with said wheel.

5. The golf cart of claim 1 wherein, said side arms of said U-shaped member has padding thereon to receive an upper portion of the golf bag.

6. The golf cart of claim 5 wherein said lower frame includes a first lower frame member extending from proximate said first rear wheel to proximate a first side of said front wheel, a second lower frame member extending from proximate said second rear wheel to proximate a second side of said front wheel, and a plurality of transverse lower frame members extending between said first and second lower frame members.

7. The golf cart of claim 6 further including padding on one of said transverse frame members to receive a bottom end of the golf bag.

8. The golf cart of claim 1 wherein said means for securing said handle to said upper frame comprises adjustable pivotable means whereby said handle may be adjusted to a desired position.

9. The golf cart of claim 8 wherein said pivotable adjustment means provides means for said handle to pivot to lie substantially adjacent to said upper frame.

10. The golf cart of claim 1 wherein said handle means are removeable from said means for securing said handle to said upper frame.

11. The golf cart of claim 1 wherein each of said front wheel and said first and second rear wheels are of a substantially equal diameter.

12. The golf cart of claim 1 wherein said means for hingedly securing said upper frame to said lower frame comprises an axle member extending through said upper frame and said lower frame, and clip means for retaining said upper frame in an upright position with respect to said lower frame.

13. The golf cart of claim 12 wherein said clip means comprises at least one clip member mounted on said upper frame, said clip member having a generally U-shaped recess formed therein and sized to receive and retain said axle member.

14. A golf cart for receiving and supporting a golf bag, said golf cart comprising:

a lower frame having a front end and a rear end;

a front wheel mounted at said front end of said lower frame;

first and second rear wheels mounted at opposite sides of said lower frame proximate said rear end of said lower frame;

an upper frame formed by a pair of leg members extending upwardly from said lower frame adjacent said rear end of said lower frame, said upper frame being hingedly secured to said lower frame;

a generally U-shaped bag receiving cradle having opposite ends joined to upper ends of said pair of leg members with said bag receiving cradle extending rearwardly and downwardly of said upper frame to receive and support an upper portion of said golf bag;

a handle pivotally secured to said pair of leg members of said upper frame;

retaining means for retaining said upper frame in a generally vertical orientation, said upper frame folding downwardly to lie adjacent said lower frame such that said generally U-shaped bag receiving cradle extends about an upper portion said front wheel when in a folded position.

* * * * *